(12) United States Patent
Lai et al.

(10) Patent No.: US 12,736,842 B2
(45) Date of Patent: Sep. 15, 2026

(54) POLARIZER AND DISPLAY

(71) Applicant: GUANGZHOU LUXVISIONS INNOVATION TECHNOLOGY LIMITED, Guangzhou (CN)

(72) Inventors: Yi-Chih Lai, Guangzhou (CN); Lee-Lin Tsai, Guangzhou (CN); Wei-Han Wu, Guangzhou (CN)

(73) Assignee: GUANGZHOU LUXVISIONS INNOVATION TECHNOLOGY LIMITED, Guangzhou (CN)

( * ) Notice: Subject to any disclaimer, the term of this patent is extended or adjusted under 35 U.S.C. 154(b) by 292 days.

(21) Appl. No.: 18/384,135

(22) Filed: Oct. 26, 2023

(65) Prior Publication Data

US 2024/0248243 A1 Jul. 25, 2024

(30) Foreign Application Priority Data

Jan. 19, 2023 (CN) ......................... 202310078809.5

(51) Int. Cl.

*G02F 1/1335* (2006.01)
*G02B 5/30* (2006.01)
*G02F 1/03* (2006.01)
*G02F 1/13357* (2006.01)

(52) U.S. Cl.

CPC ........... *G02F 1/1335* (2013.01); *G02B 5/305* (2013.01); *G02F 1/0311* (2013.01); *G02F 1/133528* (2013.01); *G02F 1/13362* (2013.01)

(58) Field of Classification Search

USPC ....................................... 359/566; 349/96–98

See application file for complete search history.

(56) References Cited

U.S. PATENT DOCUMENTS

2014/0192409 A1* 7/2014 Yamaguchi .......... G02B 5/3058 359/485.05

FOREIGN PATENT DOCUMENTS

JP P2003-57442 A * 2/2003

* cited by examiner

*Primary Examiner* — Dung T Nguyen

(74) *Attorney, Agent, or Firm* — Birch, Stewart, Kolasch & Birch, LLP

(57) ABSTRACT

A polarizer includes a first polarization layer group. The first polarization layer group includes a first light-transmitting layer and a second light-transmitting layer. The first light-transmitting layer has a first X-direction (TM) refractive index and a first Y-direction (TE) refractive index. The second light-transmitting layer is superimposed on a top surface of the first light-transmitting layer. The second light-transmitting layer has a first light-transmitting medium and a second light-transmitting medium laterally arranged so that the second light-transmitting layer equivalently has a second X-direction refractive index and a second Y-direction refractive index. The first Y-direction refractive index is different from the second Y-direction refractive index, and the first X-direction refractive index is essentially the same as the second X-direction refractive index. A third refractive index of the first light-transmitting medium is different from a fourth refractive index of the second light-transmitting medium.

16 Claims, 13 Drawing Sheets

POLARIZER AND DISPLAY

CROSS-REFERENCE TO RELATED APPLICATION

This non-provisional application claims priority under 35 U.S.C. § 119(a) to Patent Application No. 202310078809.5 filed in China on Jan. 19, 2023, the entire contents of which are hereby incorporated by reference.

BACKGROUND

Technical Field

The present disclosure relates to a polarizer, and in particular to a polarizer that combines the advantages of a metal wire grid polarizer and a multi-layer film reflective polarizer.

Related Art

The existing reflective polarizing film technology can be divided into a metal wire grid polarizer and a multi-layer film reflective polarizer. The metal wire grid polarizer has an excellent optical extinction ratio, but its absorption coefficient results in poor light efficiency. The multi-layer film reflective polarizer has little difference in birefringence between two directions of the material, needs to stack hundreds of layers of films, and has poor TE (Transverse Electric) and TM (Transverse Magnetic) wave transmission coefficient and extinction ratio.

SUMMARY

In view of the defects of the prior art, the present disclosure provides a polarizer, including a first polarization layer group. The first polarization layer group includes a first light-transmitting layer and a second light-transmitting layer. The first light-transmitting layer has a first X-direction (TM) refractive index and a first Y-direction (TE) refractive index. The second light-transmitting layer is superimposed on a top surface of the first light-transmitting layer. The second light-transmitting layer has a first light-transmitting medium and a second light-transmitting medium arranged laterally. A third refractive index of the first light-transmitting medium is different from a fourth refractive index of the second light-transmitting medium so that the second light-transmitting layer equivalently has a second X-direction refractive index and a second Y-direction refractive index. The first Y-direction refractive index is different from the second Y-direction refractive index, and the first X-direction refractive index is essentially the same as the second X-direction refractive index.

In some embodiments, the present disclosure provides a display, including a display body and a polarizer. The polarizer is arranged in the display body. The polarizer includes a first polarization layer group. The first polarization layer group includes a first light-transmitting layer and a second light-transmitting layer. The first light-transmitting layer has a first X-direction refractive index and a first Y-direction refractive index. The second light-transmitting layer is superimposed on a top surface of the first light-transmitting layer. The second light-transmitting layer has a first light-transmitting medium and a second light-transmitting medium arranged laterally. A third refractive index of the first light-transmitting medium is different from a fourth refractive index of the second light-transmitting medium so that the second light-transmitting layer equivalently has a second X-direction refractive index and a second Y-direction refractive index. The first Y-direction refractive index is different from the second Y-direction refractive index, and the first X-direction refractive index is essentially the same as the second X-direction refractive index.

According to the above description, the present disclosure has the following advantages: (1) The absorption of light by metals can be reduced. (2) Due to different refractive indices in X and Y directions, when multiple polarization layer groups are stacked one atop another, the number of stack layers can be effectively reduced to reduce the overall thickness. (3) The extinction ratio is comparable to that of a metal wire grid polarizer and superior to that of a multi-layer film polarizer.

The present disclosure is described in detail below with reference to the drawings and specific embodiments which are not intended to limit the present disclosure.

DETAILED DESCRIPTION

Figure 1:
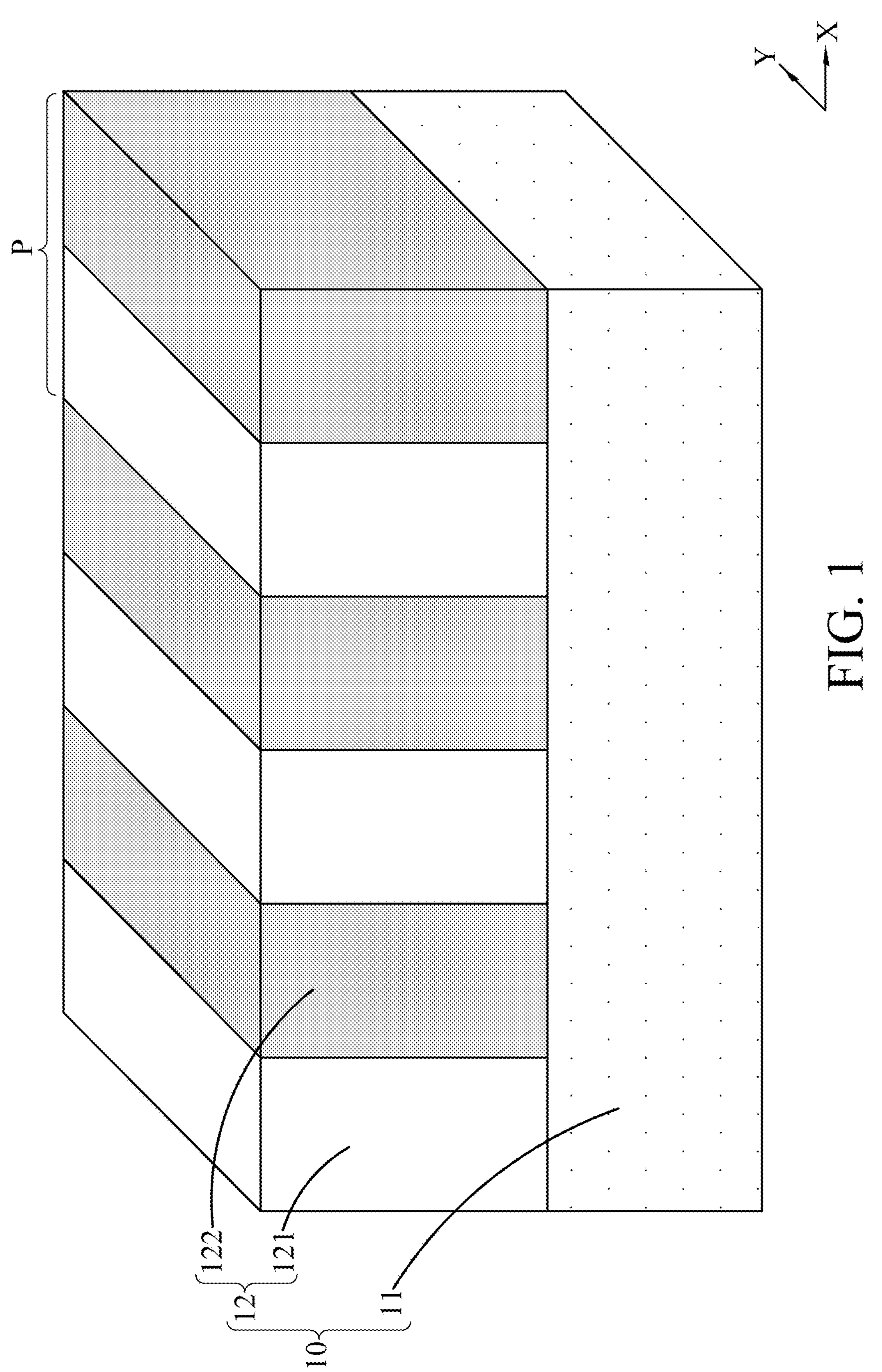
FIG. 1 shows a schematic diagram of a first polarization layer group in some embodiments of the present disclosure.

The structural principle and working principle of the present disclosure are specifically described below with reference to the drawings:

Referring to FIG. 1, the present disclosure relates to a polarizer. The polarizer includes a first polarization layer group 10. The first polarization layer group 10 includes a first light-transmitting layer 11 and a second light-transmitting layer 12.

Figure 2:
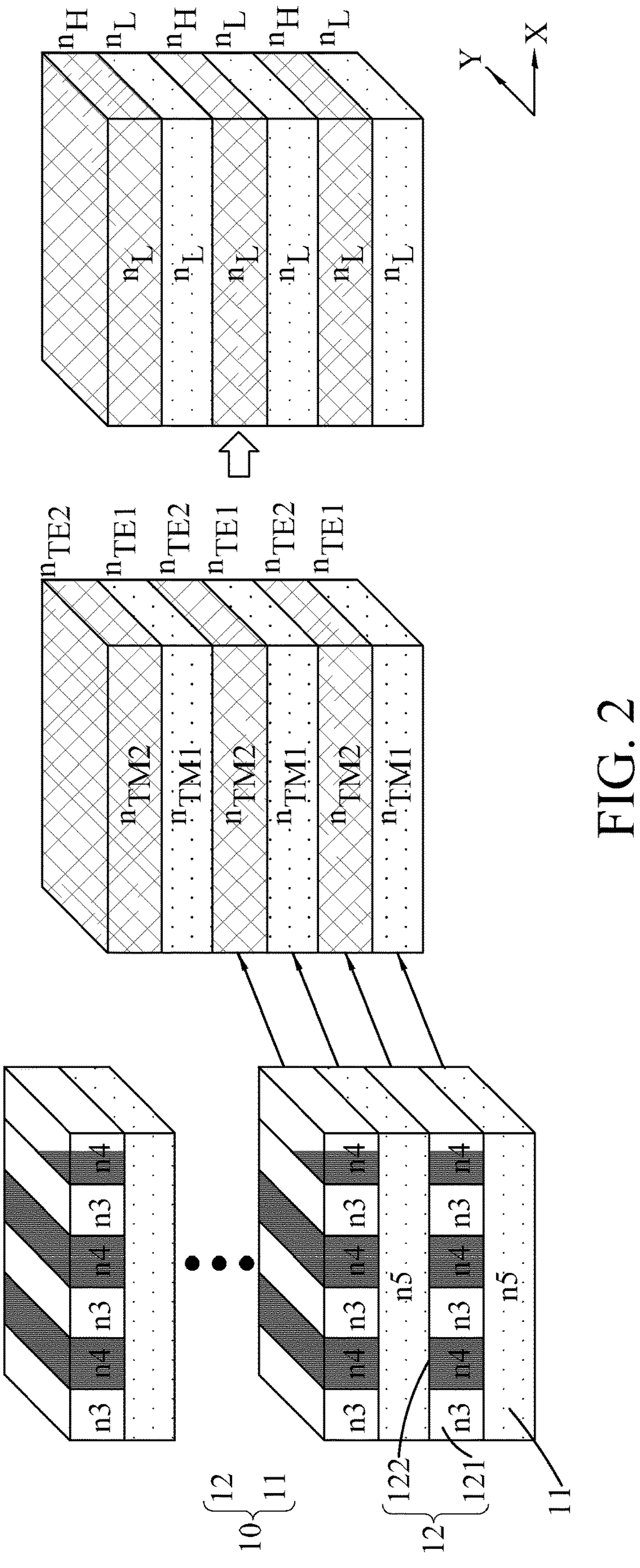
FIG. 2 shows a schematic diagram of a plurality of first polarization layer groups being stacked and refractive indices in some embodiments of the present disclosure.

Referring to FIG. 1, the first light-transmitting layer 11 has a first X-direction refractive index $n_{TM1}$ and a first Y-direction refractive index $n_{TE1}$. The first X-direction refractive index $n_{TM1}$ is a refractive index along the X-axis as shown in FIGS. 1 and 2 and the first Y-direction refractive index $n_{TE1}$ is a refractive index along the Y-axis as shown in FIGS. 1 and 2. In some embodiments, the production material of the first light-transmitting layer 11 is selected from a group composed of dielectric materials, glass, silicon, a cyclic olefin copolymer (COC), a cyclic olefin polymer (COP), polycarbonate (PC), polyethylene terephthalate (PET), polyimide (PI), polyether sulfone (PES), polyethylene naphthalate (PEN), triacetate cellulose (TAC), and polymethyl methacrylate (PMMA). An X-direction refractive index is a refractive index in a transverse magnetic (TM) wave direction (i.e. the X-axis as shown in FIGS. 1 and 2), and a Y-direction refractive index is a refractive index in a transverse electric (TE) wave direction (i.e. the Y-axis as shown in FIGS. 1 and 2). Since the first light-transmitting layer 11 is made of a homogeneous material, the first X-direction refractive index $n_{TM1}$ is the same as the first Y-direction refractive index $n_{TE1}$.

Referring to FIG. 1, the second light-transmitting layer 12 is superimposed on a top surface of the first light-transmitting layer 11. The second light-transmitting layer 12 has a first light-transmitting medium 121 and a second light-transmitting medium 122 arranged along the X-axis. In the embodiments shown in FIG. 1, the first polarization layer group 10 includes a plurality of first light-transmitting media 121 and a plurality of second light-transmitting media 122. The plurality of first light-transmitting media 121 and the plurality of second light-transmitting media 122 are alternately laterally arranged along the X-axis as shown in FIG. 1. Thus, the plurality of first light-transmitting media 121 and the plurality of second light-transmitting media 122 are arranged in a interdigitated and close-packed manner to form the second light-transmitting layer 12. Each of the first light-transmitting medium 121 has a third refractive index n3. Each of the second light-transmitting medium 122 has a fourth refractive index n4. The third refractive index n3 is different from the fourth refractive index n4. The second light-transmitting layer 12 has a second X-direction refractive index $n_{TM2}$ and a second Y-direction refractive index $n_{TE2}$. The first Y-direction refractive index $n_{TE1}$ is different from the second Y-direction refractive index $n_{TE2}$. The first X-direction refractive index $n_{TM1}$ is essentially the same as the second X-direction refractive index $n_{TM2}$.

Since the first light-transmitting medium 121 and the second light-transmitting medium 122 are arranged in parallel, the second X-direction refractive index $n_{TM2}$ and the second Y-direction refractive index $n_{TE2}$ of the second light-transmitting layer 12 are equivalent refractive indices of the first light-transmitting medium 121 and the second light-transmitting medium 122. The calculation formula of the second X-direction refractive index $n_{TM2}$ is shown in Formula 1. The calculation formula of the second Y-direction refractive index $n_{TE2}$ is shown in Formula 2. The total length of an adjacent the first light-transmitting medium 121 and the second light-transmitting medium 122 along the X-axis is defined as a structural period P (as shown in FIG. 1). The proportion (or called as filling factor or duty cycle) f is the ratio of the length of the first light-transmitting medium 121 along the X-axis to the structural period P. It can be known from Formula 1 and Formula 2 that after the materials of the first light-transmitting medium 121 and the second light-transmitting medium 122 are determined, the second X-direction refractive index $n_{TM2}$ and the second Y-direction refractive index $n_{TE2}$ can be determined by adjusting the proportion f (or by adjusting the length of the first light-transmitting medium 121 along the X-axis). Thus, in some embodiments, the first Y-direction refractive index $n_{TE1}$ is different from the second Y-direction refractive index $n_{TE2}$. In some embodiments, the first X-direction refractive index $n_{TM1}$ is essentially the same as the second X-direction refractive index $n_{TM2}$. Alternatively, a user could determine the proportion f, and then the second X-direction refractive index $n_{TM2}$ and the second Y-direction refractive index $N_{TE2}$ can be determined by choosing the materials of the first light-transmitting medium 121 and the second light-transmitting medium 122.

$$n_{TM2}^2 = \frac{(n_1 n_2)^2}{f * n_2^2 + (1-f) * n_1^2} \qquad \text{Formula 1}$$

$$n_{TE2}^2 = f * n_1^2 + (1-f) * n_2^2 \qquad \text{Formula 2}$$

As mentioned above, when the wavelength of the incident light is much greater than the structural period P, the polarizer has relatively equivalent refractive indices in X and Y directions, so as to construct an equivalent birefringent material, so that the present disclosure has the following advantages: (1) The absorption of light by metals can be reduced. (2) Due to different refractive indices in X and Y directions, when a plurality of first polarization layer groups 10 are stacked one atop another, the number of stack layers can be effectively reduced to reduce the overall thickness. (3) The extinction ratio is comparable to that of a metal wire grid polarizer and superior to that of a multi-layer film polarizer.

In some embodiments, as shown in Formula 3, in a case that an incident angle is 0°, a product of a quadruple thickness $h_1$ of the first light-transmitting layer 11 and the first Y-direction refractive index $n_{TE1}$ meets a wavelength of incident light. As shown in Formula 4, a product of a quadruple thickness $h_2$ of the second light-transmitting layer 12 and the second Y-direction refractive index $n_{TE2}$ meets the wavelength of incident light. Here, m represents any integer, such as 1, 2, 3, . . . , $\lambda_0$ represents a wavelength of incident light, $n_{TE2}$ represents a second Y-direction refractive index $n_{TE2}$, and $n_{TE1}$ represents a first Y-direction refractive index $n_{TE1}$.

$$h_1 = m * \frac{\lambda_0}{4n_{TE1}}$$ Formula 3

$$h_2 = m * \frac{\lambda_0}{4n_{TE2}}$$ Formula 4

In some embodiments, the first light-transmitting medium 121 and the second light-transmitting medium 122 are respectively made of dielectric materials. The dielectric materials include, but are not limited to, silicon dioxide ($SiO_2$), tantalum pentoxide ($Ti_2O_5$), titanium dioxide ($TiO_2$), silicon (Si), gallium nitride (GaN), gallium phosphide (GaP), and gallium arsenide (GaAs). In addition, one of the first light-transmitting medium 121 and the second light-transmitting medium 122 may be air.

In some embodiments, the first light-transmitting layer 11 has a fifth refractive index n5, and the fifth refractive index n5 is essentially the same as the third refractive index n3 or the fourth refractive index n4. In other words, the fifth refractive index n5 is substantially the same as the third refractive index n3, but different from the fourth refractive index n4. Or, the fifth refractive index n5 is substantially the same as the fourth refractive index n4, but different from the third refractive index n3. In some embodiments, the third refractive index n3, the fourth refractive index n4, and the fifth refractive index n5 are different, and the third refractive index n3>the fifth refractive index n5>the fourth refractive index n4, or the fourth refractive index n4>the fifth refractive index n5>the third refractive index n3.

Referring to FIG. 2, during an actual implementation of the present disclosure, a plurality of identical first polarization layer groups 10 are stacked one atop another. The first X-direction refractive index $n_{TM1}$ and the first Y-direction refractive index $n_{TE1}$ of the first light-transmitting layer 11 are the same and are both the fifth refractive index n5. As mentioned above, the first light-transmitting medium 121 and the second light-transmitting medium 122 of the second light-transmitting layer 12 have equivalent refractive indices including the second X-direction refractive index $n_{TM2}$ and the second Y-direction refractive index $n_{TE2}$. In order to construct the equivalent birefringent material as a whole, it is necessary to adjust the proportion f to make the first X-direction refractive index $n_{TM1}$ the same as the second X-direction refractive index $n_{TM2}$, and the first Y-direction refractive index $n_{TE1}$ different from the second Y-direction refractive index $n_{TM2}$. In order to further highlight the difference in refractive index, the first X-direction refractive index $n_{TM1}$, the first Y-direction refractive index $n_{TE1}$, and the second X-direction refractive index $n_{TM2}$ are all the same and thus are named as a sixth refractive index $n_L$, and the second Y-direction refractive index $n_{TE2}$ is named as a seventh refractive index $n_H$. In this way, as shown in FIG. 2, it is clear that the refractive indices of the polarizer along the X-axis are all the same, while the refractive indices of the polarizer along the Y-axis present a state of alternating two refractive indices, and the thicknesses of each first light-transmitting layer 11 and the thicknesses of each second light-transmitting layer 12 in the Y-axis direction meet a quarter of the wavelength of incident light.

Figure 6:
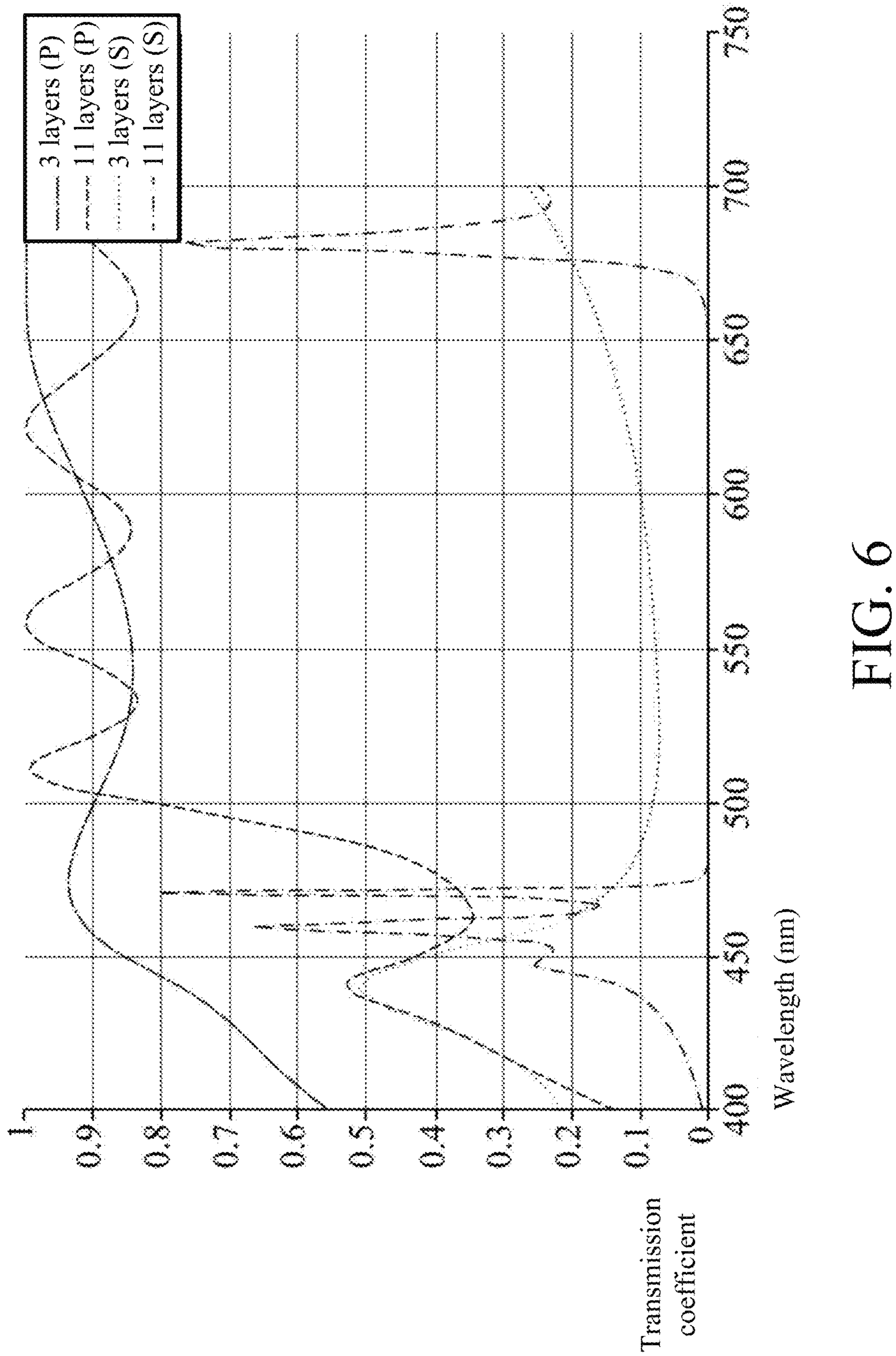
FIG. 6 shows an experimental data diagram of transmission coefficients of a TM (Transverse Magnetic) wave and a TE (Transverse Electric) wave for 3 first polarization layer groups are stacked one atop another and 11 first polarization layer groups are stacked one atop another in some embodiments of the present disclosure.
Figure 7:
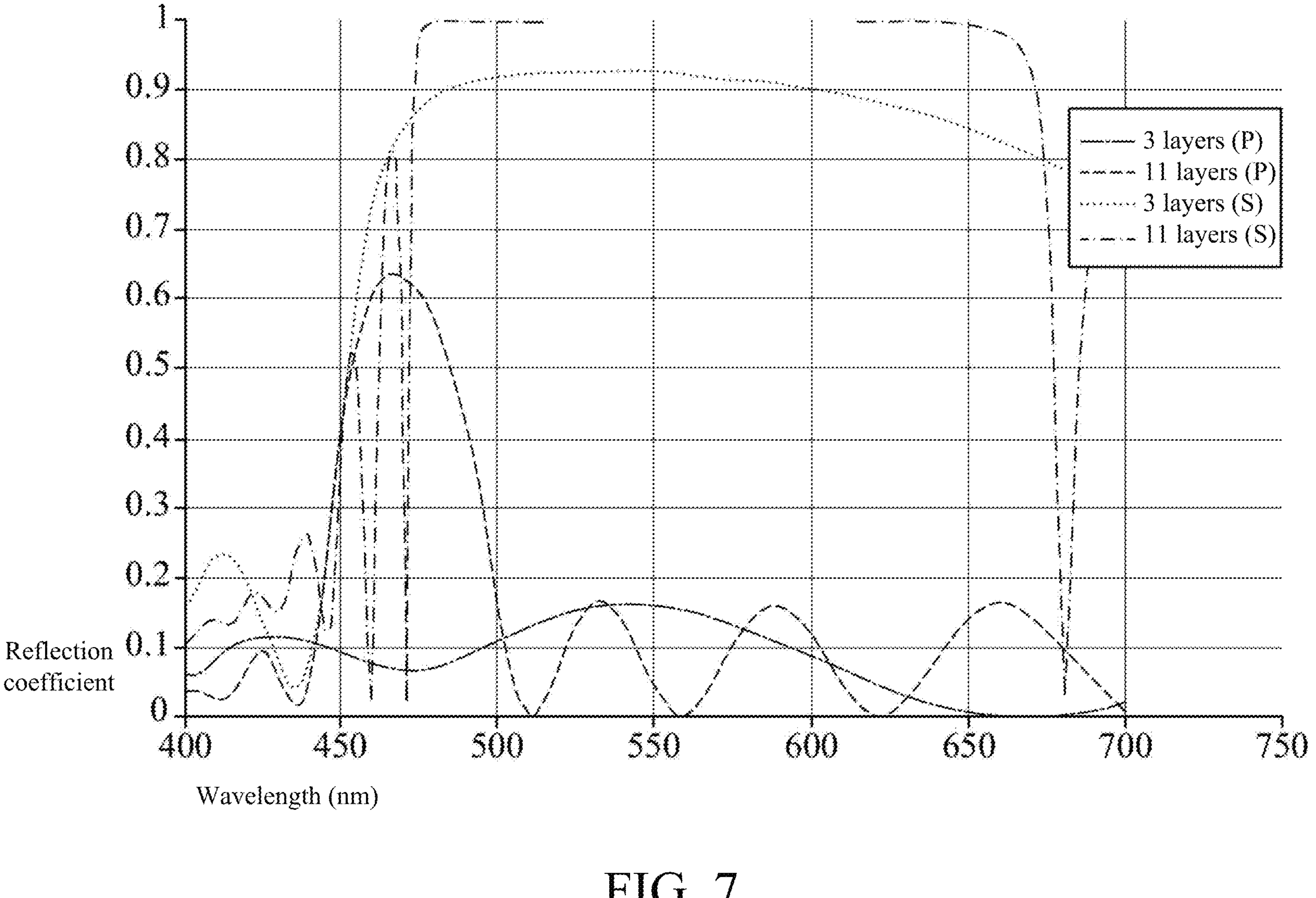
FIG. 7 shows an experimental data diagram of reflection coefficients of a TM wave and a TE wave after 3 first polarization layer groups are stacked mutually and 11 first polarization layer groups are stacked mutually in some embodiments of the present disclosure.
Figure 8:
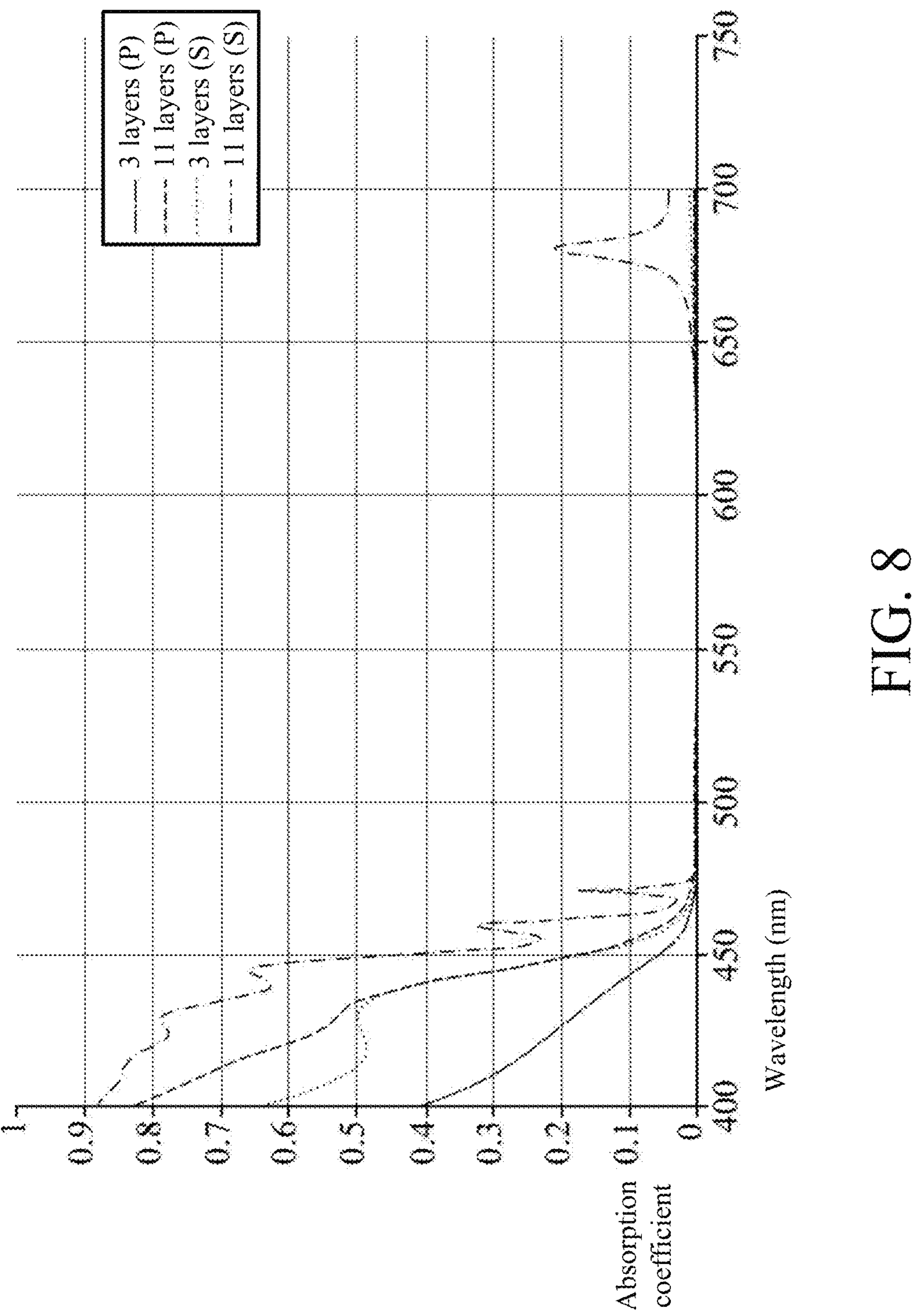
FIG. 8 shows an experimental data diagram of absorption coefficients of a TM wave and a TE wave after 3 first polarization layer groups are stacked mutually and 11 first polarization layer groups are stacked mutually in some embodiments of the present disclosure.
Figure 9:
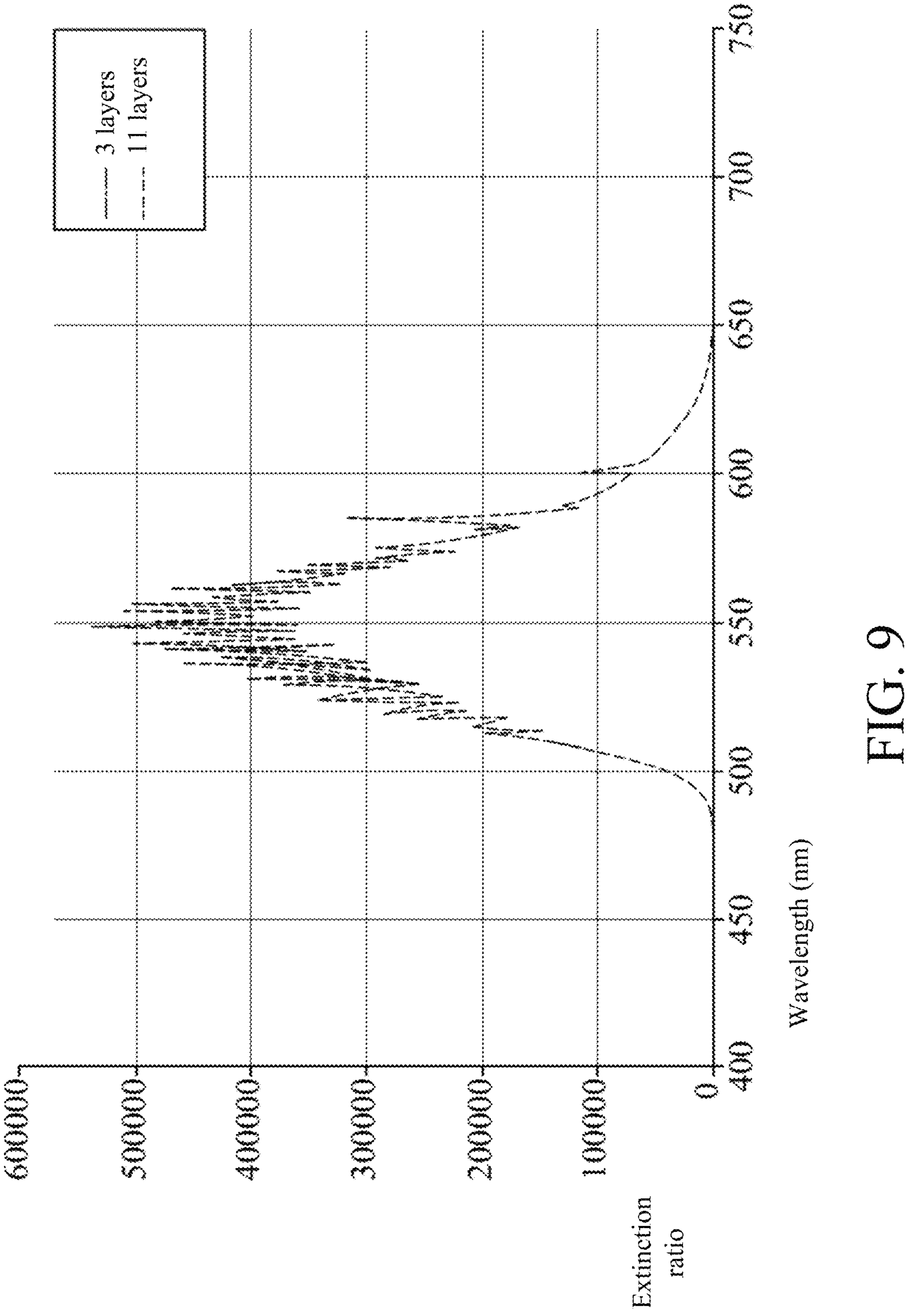
FIG. 9 shows an experimental data diagram of extinction ratios of a TM wave and a TE wave after 3 first polarization layer groups are stacked mutually and 11 first polarization layer groups are stacked mutually in some embodiments of the present disclosure.
Figure 9A:
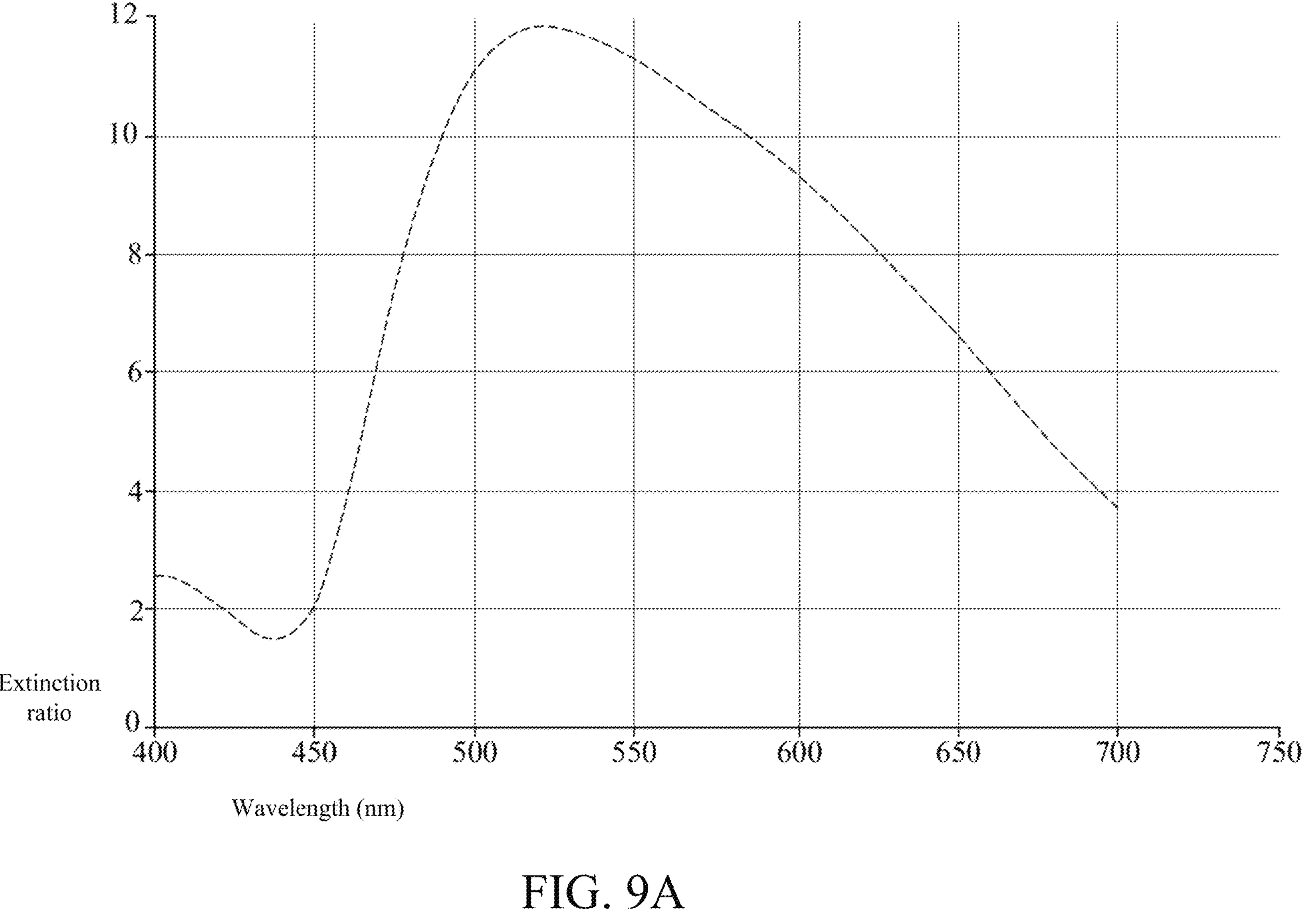
FIG. 9A shows an enlarged diagram of experimental data of extinction ratios of a TM wave and a TE wave after 3 first polarization layer groups are stacked mutually in FIG. 9.
Figure 10:
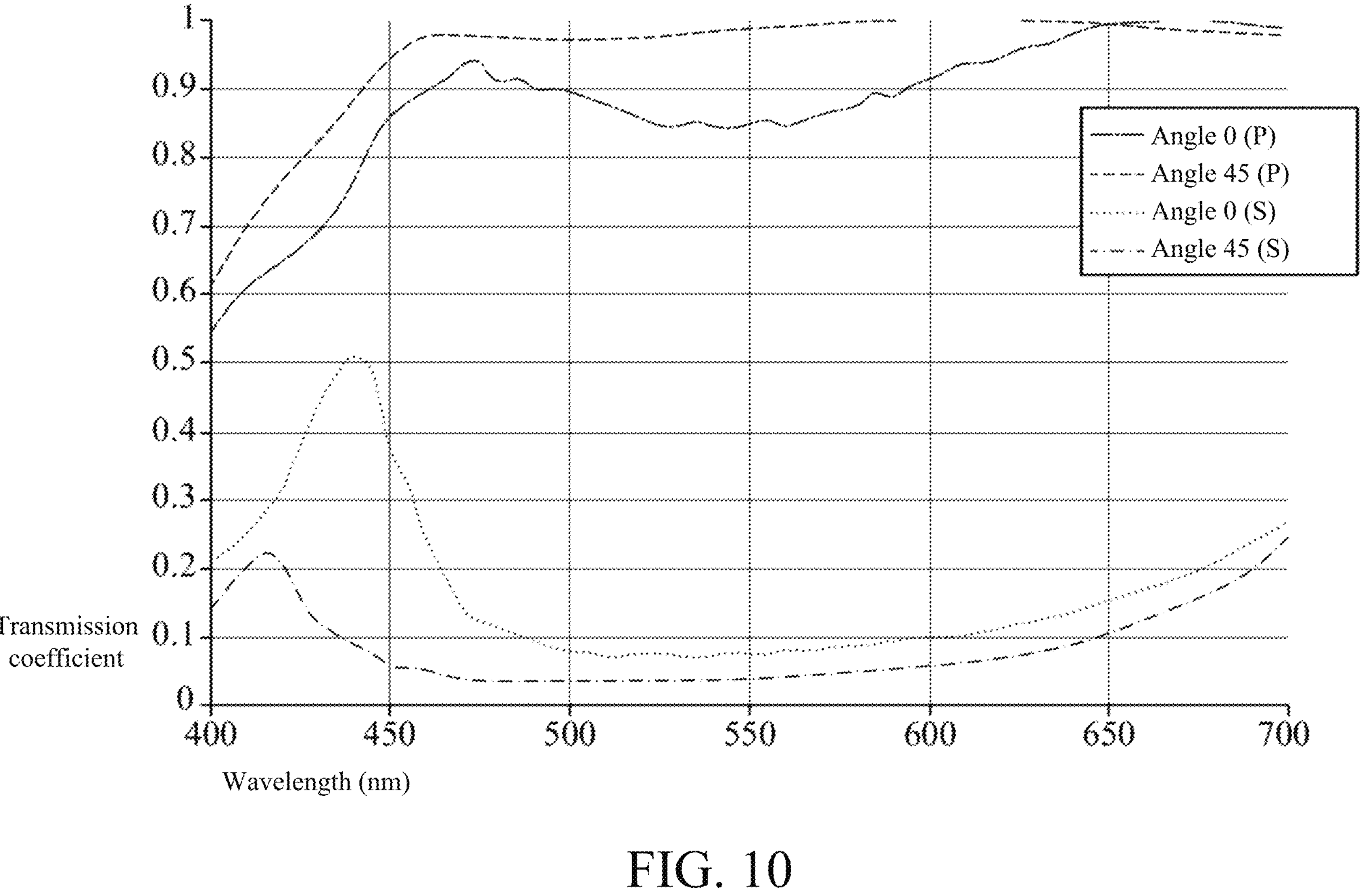
FIG. 10 shows an experimental data diagram of transmission coefficients of a TE wave and a TM wave at incident angles of 0° and 45° after 3 first polarization layer groups are stacked mutually in some embodiments of the present disclosure.
Figure 11:
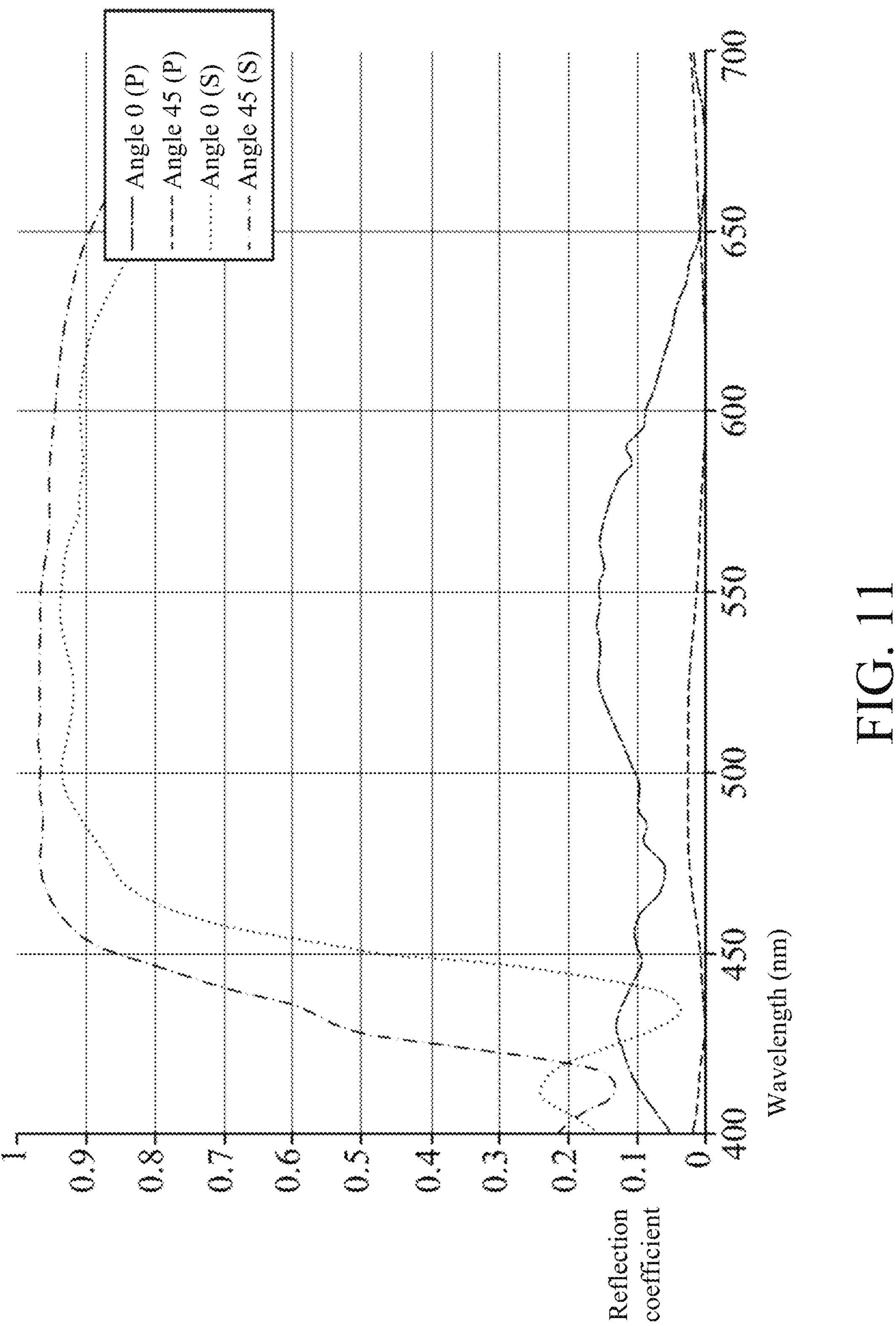
FIG. 11 shows an experimental data diagram of reflection coefficients of a TE wave and a TM wave at incident angles of 0° and 45° after 3 first polarization layer groups are stacked mutually in some embodiments of the present disclosure.
Figure 12:
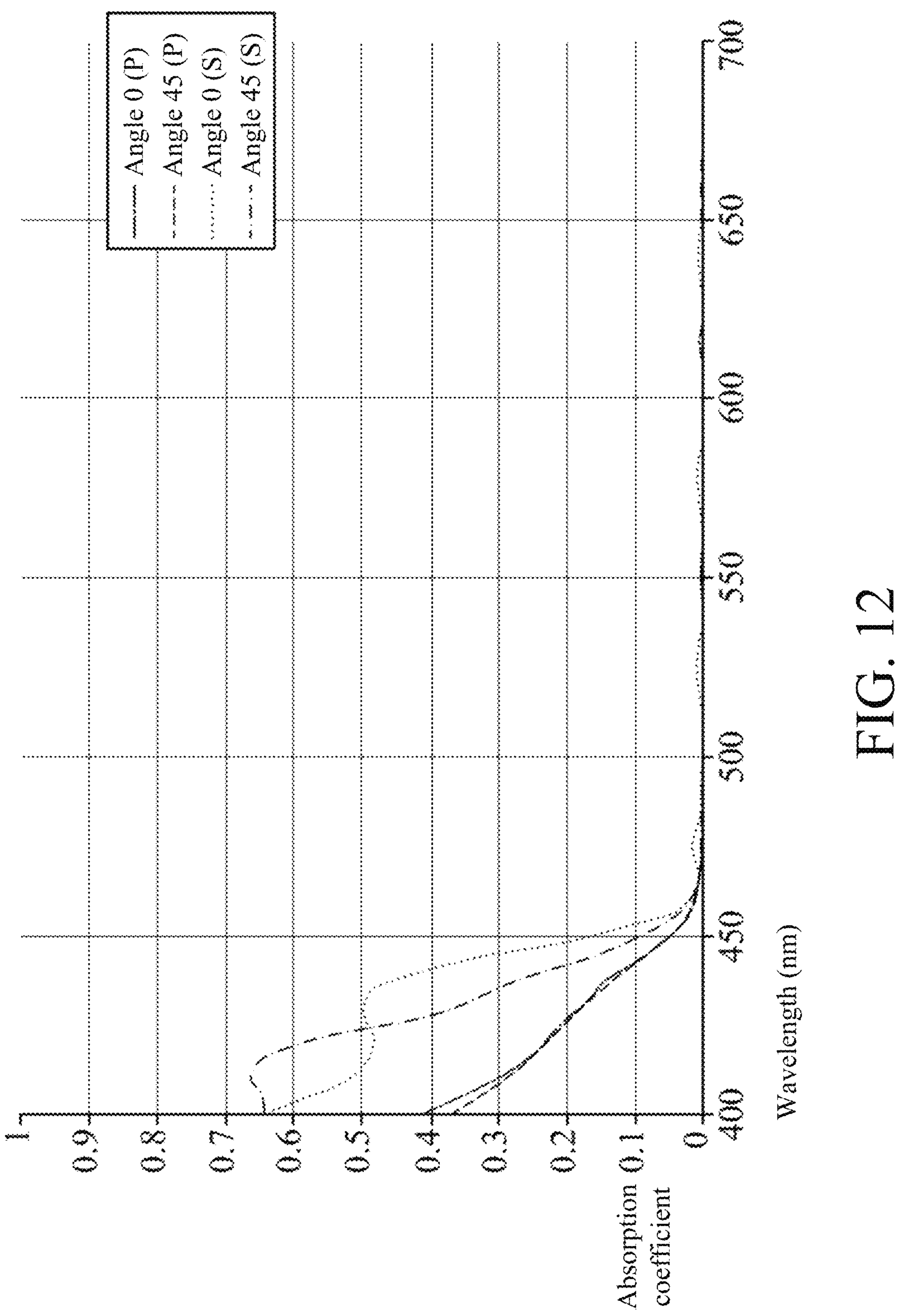
FIG. 12 shows an experimental data diagram of absorption coefficients of a TE wave and a TM wave at incident angles of 0° and 45° after 3 first polarization layer groups are stacked mutually in some embodiments of the present disclosure.

Referring to FIG. 1, in some embodiments, the material of the first light-transmitting layer 11 is PMMA, the material of the first light-transmitting medium 121 is GaP, the material of the second light-transmitting medium 122 is air, the structural period P is 100 nm, and the proportion f is 0.6. Assuming that the central wavelength of incident light is 550 nm, the second X-direction refractive index $n_{TM2}$ is about 1.4901, and the second Y-direction refractive index $n_{TE2}$ is about 2.7476. According to Formula 3 and Formula 4, it can be known that the thickness of the first light-transmitting layer 11 is about 92 nm, and the thickness of the second light-transmitting layer 12 is about 50 nm. FIG. 6 shows an experimental data diagram of transmission coefficients of a TM wave and a TE wave for a polarizer having 3 (three) first polarization layer groups 10 stacked one atop another and for a polarizer having 11 (eleven) first polarization layer groups 10 stacked one atop another according to some embodiments. It can be known from FIG. 6 that in a case that incident light is visible light, the transmission coefficient of the TE wave is significantly higher than the transmission coefficient of the TM wave. FIG. 7 shows an experimental data diagram of reflection coefficients of a TM wave and a TE wave for a polarizer having 3 (three) first polarization layer groups 10 stacked one atop another and for a polarizer having 11 (eleven) first polarization layer groups 10 stacked one atop another according to some embodiment s. It can be known from FIG. 7 that in a case that incident light is visible light, the reflection coefficients of the TM wave is significantly higher than the reflection coefficient of the TE wave. FIG. 8 shows an experimental data diagram of absorption coefficients of a TM wave and a TE wave for a polarizer having 3 first polarization layer groups 10 stacked one atop another and for a polarizer having 11 first polarization layer groups 10 stacked one atop another according to some embodiments. It can be known from FIG. 8 that in a case that incident light is visible light, the absorption coefficients of the TE wave and the TM wave are almost 0. FIG. 9 shows an experimental data diagram of extinction ratios of incident light for a polarizer having 3 first polarization layer groups 10 stacked one atop another and for a polarizer having 11 first polarization layer groups 10 stacked one atop another according to some embodiments. Due to scales of the experimental data diagram of extinction ratios of incident light for a polarizer having 3 first polarization layer groups 10 stacked one atop another in FIG. 9, the experimental data diagram of the polarizer having 3 first polarization layer groups 10 in FIG. 9 is quite close to an X-axis. This part is shown in FIG. 9A, and an experimental data diagram of the polarizer having 3 first polarization layer groups 10 is displayed in different scale. It can be known from FIG. 9 and FIG. 9A that the larger the number of layers of the first polarization layer groups 10, the better the extinction ratio of incident light. In addition, FIG. 10 to FIG. 12 show experimental data diagrams for a polarizer having 3 first polarization layer groups stacked one atop another. FIG. 10 shows an experimental data diagram of transmission coefficients of a TE wave and a TM wave at incident angles of 0° and 45°; FIG. 11 shows an experimental data diagram of reflection coefficients of a TE wave and a TM wave at incident angles of 0° and 45°; and FIG. 12 shows an experimental data diagram of absorption coefficients of a TE wave and a TM wave at incident angles of 0° and 45°. From this figure, it can be known that the absorption coefficient of the polarizer in a visible light band is almost 0. The extinction ratio refers to a ratio of the transmission coefficient of the TE wave to the transmission coefficient of the TM wave, that is, extinction $$\text{ratio} = \frac{T_{TM}}{T_{TE}}.$$

Figure 3:
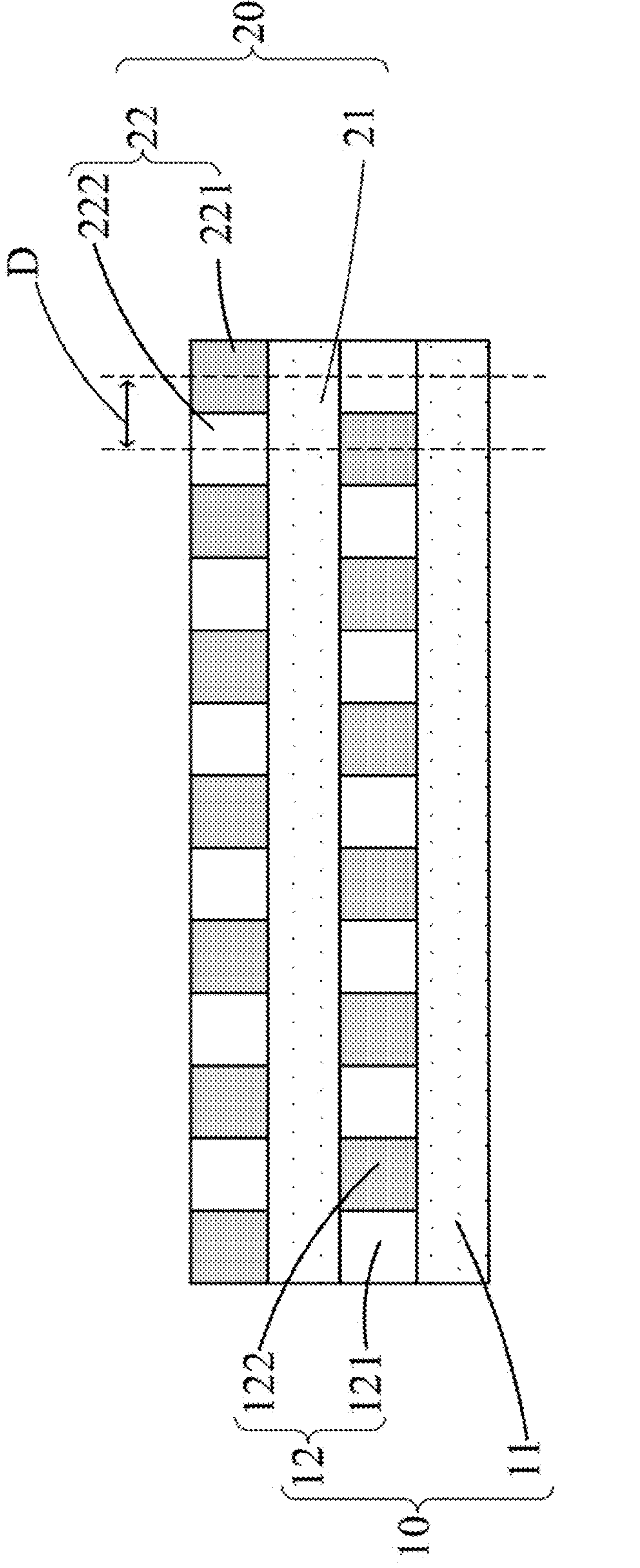
FIG. 3 shows a schematic diagram of an embodiment of a first polarization layer group in some embodiments of the present disclosure.

In some embodiments, a polarizer has a plurality of identical first polarization layer groups 10 vertically stacked one atop another. The first light-transmitting media 121 of each second light-transmitting layer 12 of each first polarization layer group 10 correspond to each other and are aligned at the same horizontal position, and the second light-transmitting media 122 of each second light-transmitting layer 12 of each first polarization layer group 10 is likewise correspond to each other and are aligned at the same horizontal position. Referring to FIG. 3, in some embodiments, a top surface of the first polarization layer group 10 is further provided with (or vertically stacked as shown in FIG. 3) a second polarization layer group 20. The first polarization layer group 10 and the second polarization layer group 20 have an identical structure, that is, the second polarization layer group 20 also includes a first light-transmitting layer 21 and a second light-transmitting layer 22, and the second light-transmitting layer 22 includes a plurality of first light-transmitting media 221 and a plurality of second light-transmitting media 222 arranged alternately. The horizontal position of the first light-transmitting media 121 of the first polarization layer group 10 is staggered (or laterally offset) from the horizontal position of the first light-transmitting media 221 of the second polarization layer group 20 by a horizontal distance D. The horizontal distance D is less than the structural period P. In this embodiment, at least one of the first light-transmitting media 121 and the second light-transmitting media 122 is rectangular. In FIG. 3, both the first light-transmitting media 121 and the second light-transmitting media 122 are rectangular, the structural period P is less than 200 nm, and the thicknesses of both the first light-transmitting layer 11 and the second light-transmitting layer 12 meet a quarter of wavelength. It can be known from FIG. 3 that the staggered structure does not affect the optical properties (that is, the transmission coefficient, the reflection coefficient, the extinction ratio, and the absorption coefficient) of the polarizer comprising the first polarization layer group 10 and the second polarization layer group 20. In addition, this embodiment may also be further implemented as follows: the refractive index of the first light-transmitting layer 11 is the same as the refractive index of one of the first light-transmitting media 121 and the second light-transmitting media 122, or the refractive indices of the first light-transmitting layer 11, the first light-transmitting media 121, and the second light-transmitting media 122 are different.

Figure 4:
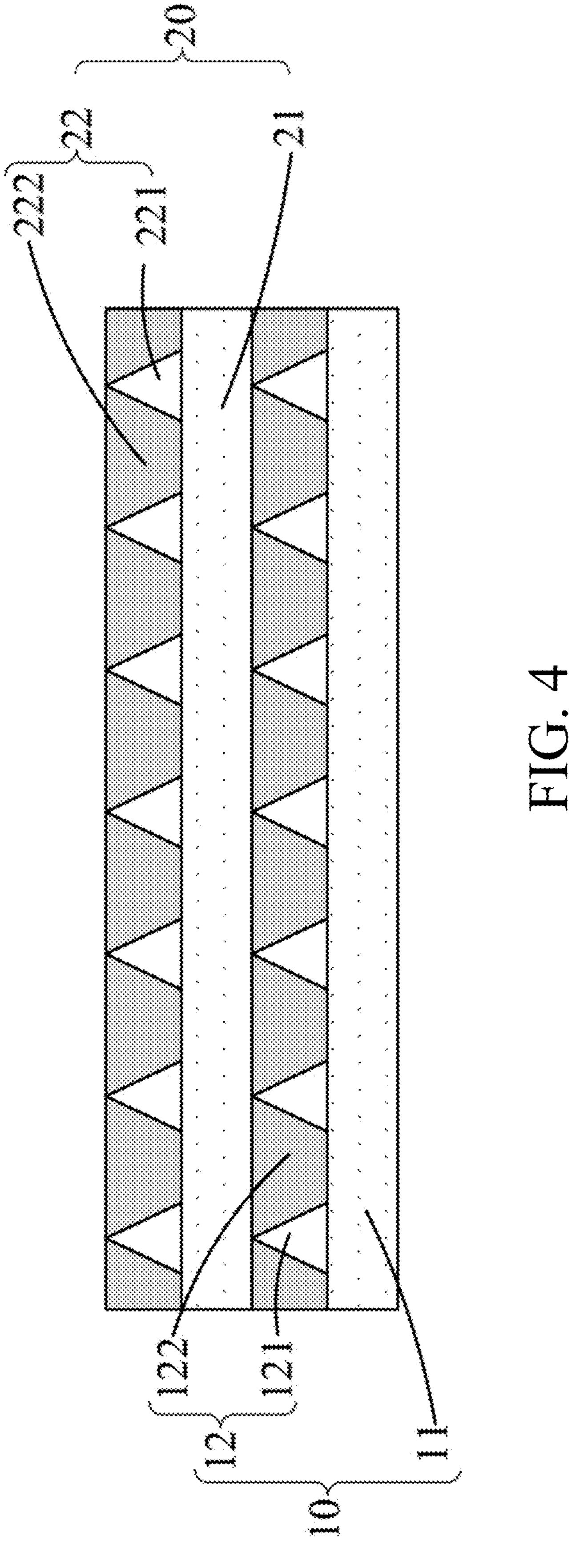
FIG. 4 shows a schematic diagram of another embodiment of a first polarization layer group in some embodiments of the present disclosure.

Referring to FIG. 4, in some embodiments, either the first light-transmitting media 121 or the second light-transmitting media 122 are configured to have a triangle shape in a cross-sectional view to form a triangular structure. FIG. 4 illustrates a configuration where both the first light-transmitting media 121 and the second light-transmitting media 122 have triangular structures. In this embodiment, the thicknesses of both the first light-transmitting layer 11 and the second light-transmitting layer 12 meet a quarter of wavelength, and the overall structural period P is less than 200 nm. In addition, in some embodiments, a horizontal distance D between a horizontal position of the first light-transmitting media 121 of the first polarization layer group 10 and a horizontal position of the first light-transmitting media 221 of the second polarization layer group 20 is less than the structural period P. This the staggered arrangement does not affect the optical properties (that is, the transmission coefficient, the reflection coefficient, the extinction ratio, and the absorption coefficient) of the polarizer comprising the first polarization layer group 10 and the second polarization layer group 20. In addition, this embodiment may also be further implemented as follows: the refractive index of the first light-transmitting layer 11 is the same as the refractive index of one of the first light-transmitting media 121 and the second light-transmitting media 122, or the refractive indices of the first light-transmitting layer 11, the first light-transmitting media 121, and the second light-transmitting media 122 are different.

Figure 5:
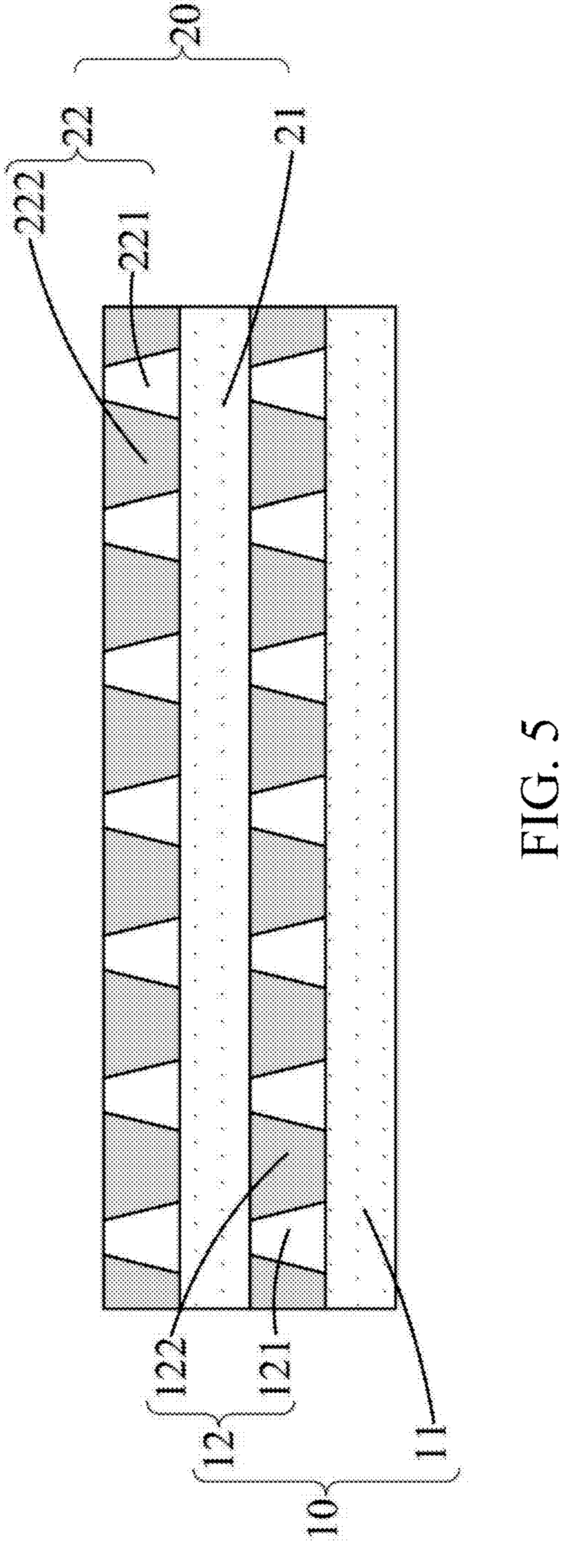
FIG. 5 shows a schematic diagram of a still another embodiment of a first polarization layer group in some embodiments of the present disclosure.

Referring to FIG. 5, in some embodiments, either the first light-transmitting media 121 and the second light-transmitting media 122 are configured to have a trapezoid shape in a cross-sectional view to form a trapezoidal structure. FIG. 5 illustrates a configuration where both the first light-transmitting media 121 and the second light-transmitting media 122 have trapezoidal structures. In this embodiment, the thicknesses of both the first light-transmitting layer 11 and the second light-transmitting layer 12 meet a quarter of wavelength, and the overall structural period P is less than 200 nm. In addition, in some embodiments, a horizontal distance D between a horizontal position of the first light-transmitting media 121 of the first polarization layer group 10 and a horizontal position of the first light-transmitting media 221 of the second polarization layer group 20 is less than the structural period P. This manner staggered arrangement does not affect the optical properties (that is, the transmission coefficient, the reflection coefficient, the extinction ratio, and the absorption coefficient) of the polarizer comprising the first polarization layer group 10 and the second polarization layer group 20. In addition, this embodiment may also be further implemented as follows: the refractive index of the first light-transmitting layer 11 is the same as the refractive index of one of the first light-transmitting media 121 and the second light-transmitting media 122, or the refractive indices of the first light-transmitting layer 11, the first light-transmitting media 121, and the second light-transmitting media 122 are different.

In addition, although the above embodiment illustrates that the structures of the first light-transmitting media 121, 221 or the second light-transmitting media 122, 222 of the first polarization layer group 10 and the second polarization layer group 20, are identical, and are either trapezoidal, rectangular, or triangular. However, the staggered configuration of the present disclosure is not limited to this. For example, one of the first light-transmitting media 121 and the second light-transmitting media 122 of the first polarization layer group 10 may be trapezoidal, and one of the first light-transmitting media 221 and the second light-transmitting media 222 of the second polarization layer group 20 may be rectangular. Thus, the structures of the first light-transmitting media 121 and the second light-transmitting media 122 of the first polarization layer group 10 are different from the structures of the first light-transmitting media 221 and the second light-transmitting media 222 of the second polarization layer group 20. In addition, when three or more polarization layer groups are provided, the structures of three polarization layer groups may be in a combination of trapezoidal, rectangular, and triangular shapes.

In some embodiments, the present disclosure provides a display, the display includes a display body, and the above polarizer is arranged in the display body. Relevant embodiments of the polarizer can be referred to the above descriptions and will not be repeated here.

Of course, many other embodiments of the present disclosure may be provided. Without departing from the spirit and essence of the present disclosure, those skilled in the art can make various corresponding changes and deformations according to the present disclosure, but these corresponding changes and deformations should fall within the protection scope of the claims of the present disclosure.

What is claimed is:

1. A polarizer, comprising:

a first polarization layer group, comprising:

a first light-transmitting layer, having a refractive index in a transverse magnetic (TM) wave direction named as a first X-direction refractive index and a refractive index in a transverse electric (TE) wave direction named as a first Y-direction refractive index, and a second light-transmitting layer, superimposed on a top surface of the first light-transmitting layer, wherein the second light-transmitting layer has a first light-transmitting medium and a second light-transmitting medium laterally arranged along the X-direction, a third refractive index of the first light-transmitting medium is different from a fourth refractive index of the second light-transmitting medium so that the second light-transmitting layer equivalently has a refractive index in a TM wave direction named as a second X-direction refractive index and a refractive index in a TE wave direction named as a second Y-direction refractive index, the first Y-direction refractive index is different from the second Y-direction refractive index, and the first X-direction refractive index is essentially the same as the second X-direction refractive index.

2. The polarizer according to claim 1, wherein in a case that an incident angle is 0°, a product of a quadruple thickness of the first light-transmitting layer and the first Y-direction refractive index meets a wavelength of the incident light; and a product of a quadruple thickness of the second light-transmitting layer and the second Y-direction refractive index meets the wavelength of the incident light.

3. The polarizer according to claim 2, wherein the first light-transmitting medium and the second light-transmitting medium together have a structural period; and a top surface of the first polarization layer group is further provided with a second polarization layer group, the first polarization layer group and the second polarization layer group have a same structure, and a distance between a horizontal position of the first light-transmitting medium of the first polarization layer group and a horizontal position of the first light-transmitting medium of the second polarization layer group is less than the structural period.

4. The polarizer according to claim 3, wherein the first X-direction refractive index and the first Y-direction refractive index of the first light-transmitting layer are essentially the same as the third refractive index or the fourth refractive index.

5. The polarizer according to claim 4, wherein the first light-transmitting medium has a proportion in the structural period, and the second X-direction refractive index and the second Y-direction refractive index are determined according to the proportion, the third refractive index, and the fourth refractive index.

6. The polarizer according to claim 1, wherein the first light-transmitting medium and the second light-transmitting medium together have the structural period, and the structural period is much less than the wavelength of an incident light.

7. The polarizer according to claim 6, wherein the first light-transmitting medium and the second light-transmitting medium are respectively made of dielectric materials; and the production material of the first light-transmitting layer is selected from a group composed of dielectric materials, glass, silicon, a cyclic olefin copolymer (COC), a cyclic olefin polymer (COP), polycarbonate (PC), polyethylene terephthalate (PET), polyimide (PI), polyether sulfone (PES), polyethylene naphthalate (PEN), triacetate cellulose (TAC), and polymethyl methacrylate (PMMA).

8. The polarizer according to claim 6, wherein a cross-sectional shape of these first light-transmitting medium is triangular.

9. The polarizer according to claim 6, wherein a cross-sectional shape of these first light-transmitting medium is trapezoidal.

10. The polarizer according to claim 6, wherein a cross-sectional shape of these first light-transmitting medium is rectangular.

11. A display, comprising:

a display body, and a polarizer, arranged in the display body, and the polarizer comprising:

a first polarization layer group, comprising:

a first light-transmitting layer, having a refractive index in a transverse magnetic (TM) wave direction named as a first X-direction refractive index and a refractive index in a transverse electric (TE) wave direction named as a first Y-direction refractive index, and a second light-transmitting layer, superimposed on a top surface of the first light-transmitting layer, wherein the second light-transmitting layer has a first light-transmitting medium and a second light-transmitting medium laterally arranged along the X-direction, a third refractive index of the first light-transmitting medium is different from a fourth refractive index of the second light-transmitting medium so that the second light-transmitting layer equivalently has a refractive index in a TM wave direction named as a second X-direction refractive index and a refractive index in a TE wave direction named as a second Y-direction refractive index, the first Y-direction refractive index is different from the second Y-direction refractive index, and the first X-direction refractive index is essentially the same as the second X-direction refractive index.

12. The display according to claim 11, wherein in a case that an incident angle is 0°, a product of a quadruple thickness of the first light-transmitting layer and the first Y-direction refractive index meets a wavelength of the incident light; and a product of a quadruple thickness of the second light-transmitting layer and the second Y-direction refractive index meets the wavelength of the incident light.

13. The display according to claim 12, wherein the first light-transmitting medium and the second light-transmitting medium together have a structural period; and a top surface of the first polarization layer group is further provided with a second polarization layer group, the first polarization layer group and the second polarization layer group have a same structure, and a distance between a horizontal position of the first light-transmitting medium of the first polarization layer group and a horizontal position of the first light-transmitting medium of the second polarization layer group is less than the structural period.

14. The display according to claim 13, wherein the first X-direction refractive index and the first Y-direction refractive index of the first light-transmitting layer is essentially the same as the third refractive index or the fourth refractive index.

15. The display according to claim 14, wherein the first light-transmitting medium has a proportion in the structural period, and the second X-direction refractive index and the second Y-direction refractive index are determined according to the proportion, the third refractive index, and the fourth refractive index.

16. The display according to claim 11, wherein the first light-transmitting medium and the second light-transmitting medium together have the structural period, and the structural period is much less than the wavelength of an incident light.

* * * * *